United States Patent
Wasser et al.

(10) Patent No.: US 8,783,646 B2
(45) Date of Patent: Jul. 22, 2014

(54) ACTUATOR FOR OPERATING A VALVE

(75) Inventors: Tobias Wasser, Freiburg (DE); Johannes Baumgartner, Müllheim (DE)

(73) Assignee: Auma Riester GmbH + Co. KG, Mullheim (DE)

( * ) Notice: Subject to any disclaimer, the term of this patent is extended or adjusted under 35 U.S.C. 154(b) by 901 days.

(21) Appl. No.: 11/250,578

(22) Filed: Oct. 17, 2005

(65) Prior Publication Data

US 2006/0131126 A1    Jun. 22, 2006

(30) Foreign Application Priority Data

Dec. 16, 2004 (DE) .......................... 10 2004 061 162

(51) Int. Cl.
- F16D 41/20 (2006.01)
- F16D 13/08 (2006.01)
- G05G 5/16 (2006.01)

(52) U.S. Cl.
USPC ......... 251/58; 251/77; 192/223.4; 192/12 BA

(58) Field of Classification Search
USPC .............. 192/223.4, 12 BA; 251/58, 214, 77, 251/129.11
See application file for complete search history.

(56) References Cited

U.S. PATENT DOCUMENTS

| | | | |
|---|---|---|---|
| 3,110,380 A | | 11/1963 | Meyer |
| 3,726,370 A | * | 4/1973 | Hubbard, Jr. .............. 192/223.4 |
| 3,940,107 A | * | 2/1976 | Allenbaugh, Jr. .............. 251/297 |
| 4,614,257 A | | 9/1986 | Harada |
| 5,058,720 A | * | 10/1991 | Rude et al. ................... 192/41 S |
| 5,137,257 A | * | 8/1992 | Tice ......................... 251/129.11 |
| 2006/0081800 A1 | * | 4/2006 | Riester et al. ............ 251/129.01 |

FOREIGN PATENT DOCUMENTS

| | | |
|---|---|---|
| DE | 3703478 A1 | 12/1987 |
| DE | 4013176 | 10/1991 |
| DE | 199 33285 | 1/2001 |
| DE | 10234501 | 2/2004 |
| DE | 10 2004 009 573 A1 | 9/2004 |
| GB | 2 054 725 A | 2/1981 |

* cited by examiner

Primary Examiner — Atif Chaudry
(74) Attorney, Agent, or Firm — Bacon & Thomas, PLLC

(57) ABSTRACT

Actuator for operating a valve, including: a drive component; a drive shaft, which is connectable with the valve; and a torque lock, which is connectable with the drive shaft The torque lock includes at least one essentially rotationally symmetric spring element arranged in a ring-shaped housing, and is so constructed that a torque introduced via the drive component causes the drive shaft to rotate, and a torque introduced via the valve blocks rotation of the drive shaft.

8 Claims, 4 Drawing Sheets

Figure 2:
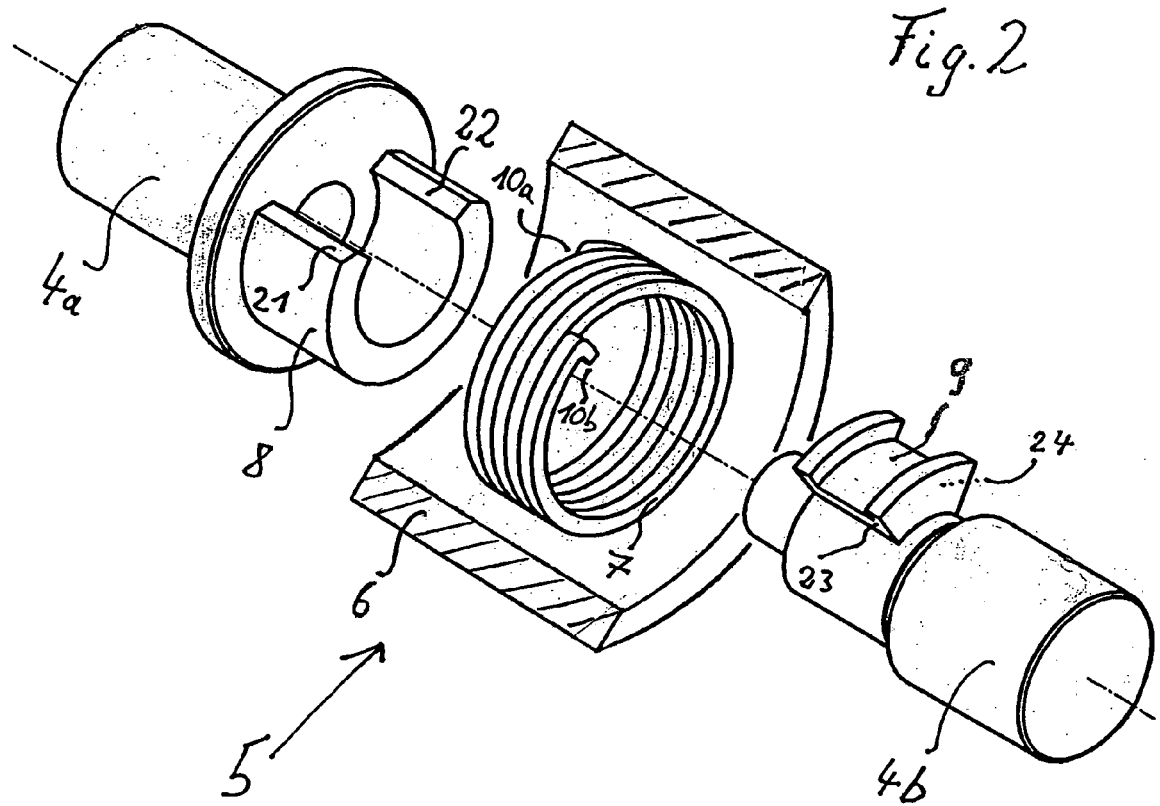

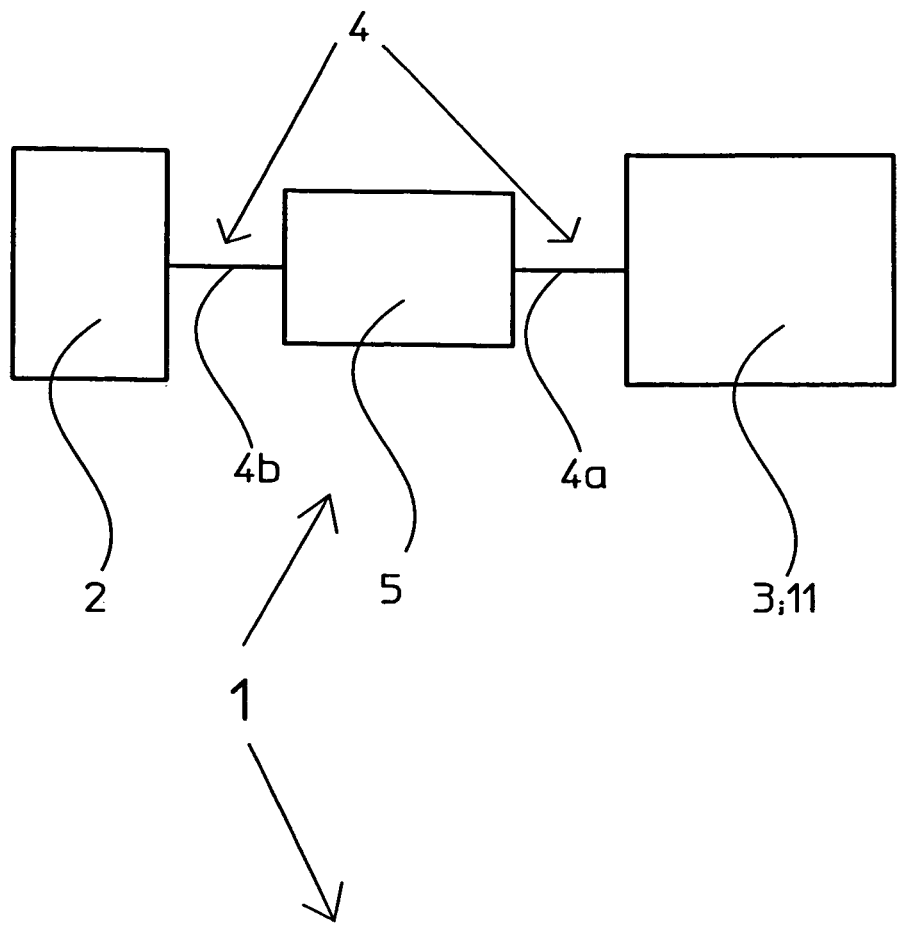
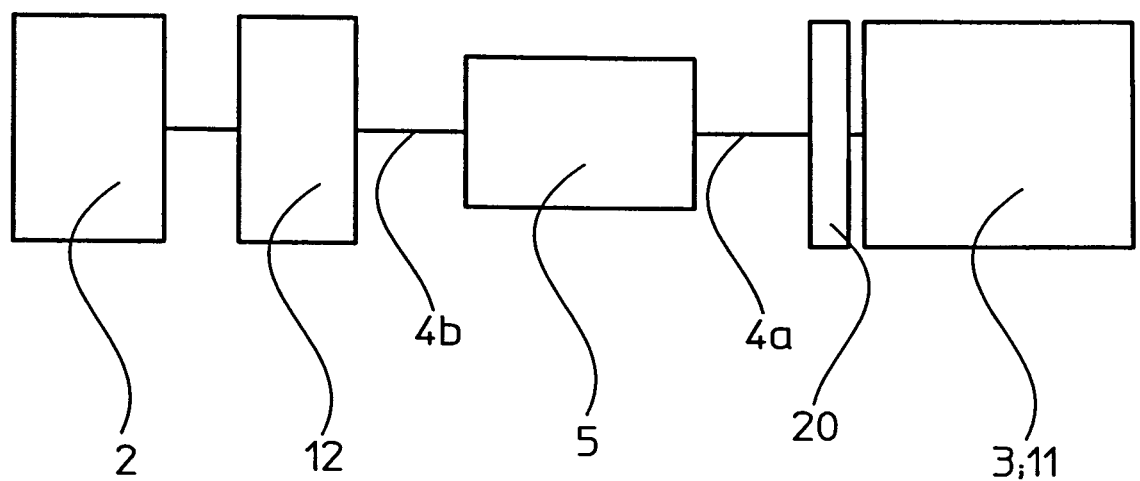

ACTUATOR FOR OPERATING A VALVE

FIELD OF THE INVENTION

The invention relates to an actuator for operating a valve, including: A drive component; a drive shaft, which is connectable with the valve; and a torque lock, which is connectable with the drive shaft.

BACKGROUND OF THE INVENTION

Torque locks are already known in the state of the art. Torque locks permit an unhindered rotational driving of a machine part—for example manually—in both directions of rotation, while reverse torques, i.e. those exerted by the driven part on the drive are blocked, as much as possible, in both senses of rotation, without an additional braking device being needed for such function. A torque lock, or load-torque lock, known from DE 85099971 U works according to the jamming rollers, or jamming wedge, principle. In such case, there is arranged within a closed, ring-shaped housing, a suitable cylindrical inner body, which is connected with the output part, thus the part to be driven, such that it cannot rotate relative thereto. The cylindrical inner body has on its periphery a recess, in which each jamming roller sits, pressed outwards by clamping springs. These prevent a rotation of the cylindrical inner body relative to the ring-shaped, outer housing. Arranged between the two jamming rolls is a strut-shaped driving part, which is e.g. a component of a hand wheel. If this driving part is rotated in one or the other direction, one of the two jamming rolls is released against the force of the pressing spring and the driven part can be adjusted. In such case, the second jamming roll then does not carry a load. Reverse torques from the driven part are, in contrast, blocked in both directions.

Rotary drives with torque locks using the jamming rollers principle are used, for example, for position securement on displacing drives for machine parts. Additionally, they serve e.g. for securing and manual adjustment of gate drives, for hatch and window securement, or for rebound protection in the case of control and shutoff butterfly valves. The disadvantage of the known torque locks based on the jamming rollers principle, or also the jamming wedge principle, is that these torque locks can exhibit a relatively critical blocking behavior. Additionally, a relatively high wear is experienced with them, since by the jamming, followed by releasing, of the jamming elements, the contacting parts are subjected to high frictional forces. Due to the wear or due to the slightest deformation of the materials, a continuing worsening of the blocking function can occur.

SUMMARY OF THE INVENTION

An object of the invention is to provide an actuator in which reverse torques from the valve are not transmitted to the drive component.

The object is solved by providing that the torque lock used in the case of the actuator of the invention has at least one essentially rotationally symmetric spring element arranged in a ring-shaped housing, with the torque lock being so constructed that a torque introduced via the drive component sets the drive shaft in rotation and that a torque introduced via the valve blocks the rotation of the drive shaft. Preferably, the spring element is so embodied, that the torque lock works extremely reliable throughout different torque ranges.

In an advantageous further development of the device of the invention, it is provided that the rotationally symmetric spring element is a wrap spring. A special embodiment provides especially that at least one entraining element is provided on the drive component, while at least one blocking piece is arranged on the output drive shaft. Furthermore, the two end regions of the wrap spring are so embodied and arranged that, in the case of an introduction of the torque via the drive component, the at least one entraining element so interacts with the two end regions of the wrap spring that the torque lock is unlocked and the drive shaft turns; in the case of an introduction of torque via the valve, in contrast, the at least one blocking piece so interacts with at least one of the two end regions of the wrap spring that the torque lock blocks. Preferably, the spring wire of the wrap spring has a square cross section. However, the cross section of the spring wire of the wrap spring can also be round. The load, or torque, introduction into the wrap spring occurs preferably via bent spring ends. The bent spring ends are optimized with reference to strength such that the torque lock works with a high degree of process stability.

In principle, the drive component can be any kind of drive. By way of example, a direct drive can be mentioned, which, for the actuator of the invention, must be so constructed that it produces a high torque at small rotational speeds. Furthermore, the drive component can be an electric motor, or an electric motor with a reduction transmission coupled therewith. Additionally, the drive component can be a separately operable, adjustment wheel, or a separately operable adjustment wheel with a reduction transmission coupled thereto. Preferably, the separately operable adjustment wheel is a hand wheel.

A preferred form of embodiment of the actuator of the invention provides a second reduction transmission, which is arranged between the valve and the torque lock. Especially a worm transmission is installed as the second reduction transmission. Worm transmissions are usually constructed such that they exhibit an intrinsic self-locking. It is true that this does reduce overall efficiency; however, the intrinsic self-locking can effectively prevent an accidental and undesired rotation of the drive shaft. As a result of the self-locking, the drive shaft moves only after a defined torque, which balances the self-locking, is exceeded. This points out a decided advantage of the actuator of the invention: Since the actuator has a torque lock, the intrinsic self-locking of the reduction transmission can be omitted. This embodiment of the actuator of the invention therefore exhibits an increased overall efficiency, compared with the known solution.

Advantageously, the torque lock used in the case of the actuator of the invention is embodied as an integral part of the drive component. However, an alternative form of embodiment provides that the torque lock is an independent function module, which is so embodied and constructed that it can be coupled to the drive shaft. This embodiment permits the retrofitting of any actuator with the torque lock of the invention.

BRIEF DESCRIPTION OF THE INVENTION

Figure 3:
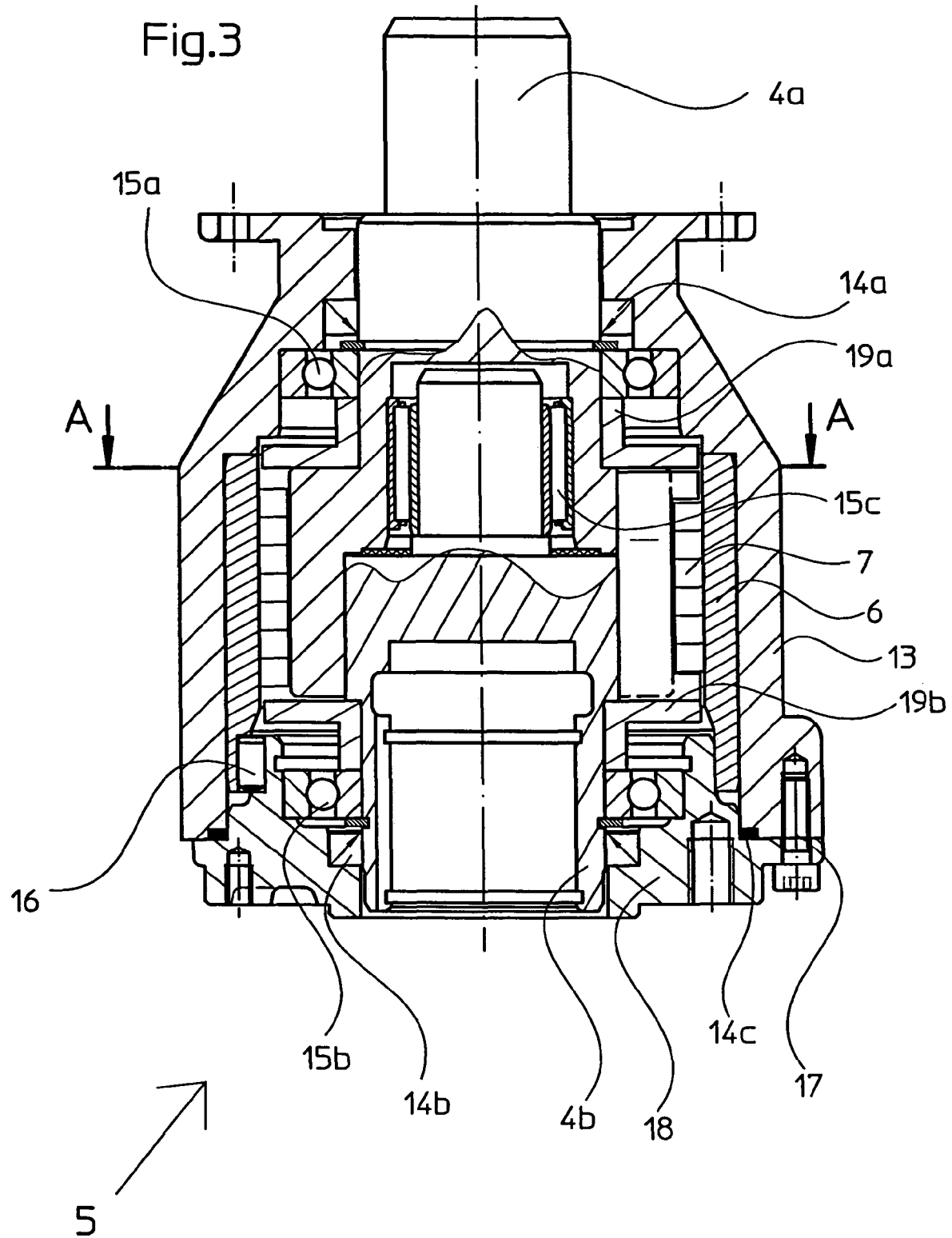
Figure 3A:
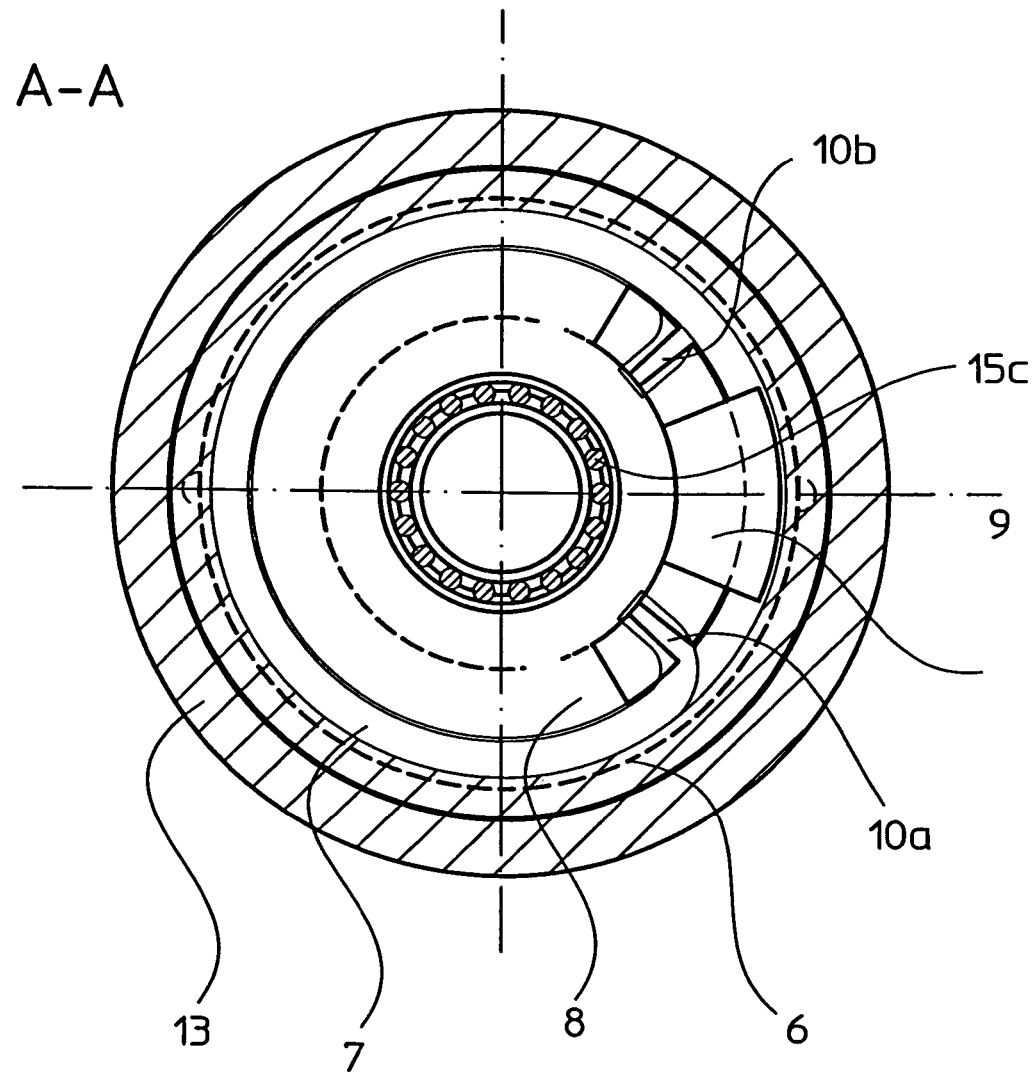

The invention will now be explained in greater detail on the basis of the drawings, the figures of which show as follows:

FIG. 1a: a schematic drawing of a first embodiment of the actuator of the invention;

FIG. 1b: a schematic drawing of a second embodiment of the actuator of the invention;

FIG. 2: a model-like, exploded drawing of a preferred form of embodiment of the torque lock of the invention;

FIG. 3: a longitudinal section through a preferred embodiment of the torque lock of the invention; and FIG. 3a: a cross section taken according to the cutting plane A-A of FIG. 3.

DESCRIPTION OF THE PREFERRED EMBODIMENTS

FIGS. 1a and 1b are schematic representations of alternate forms of embodiment of the invention. In the case of the form of embodiment shown in FIG. 1a, the drive component 3 operates the valve 2 directly via the drive shaft 4. Valve 2 is preferably an adjusting element 2, e.g. a globe or gate valve, each with spindle and threaded bushing, a throttle valve or butterfly valve. Depending on the adjusting element 2, the operating, or displacement process, which is introduced via the drive component 3, is a rotary, or swinging or pivoting, movement. The drive component 3 is preferably a direct drive 11. However, it is also possible to insert a first reduction transmission 20 after the electric motor. Of course, alternatively or additionally to the electric drive component 3, also a separately operable adjustment wheel, e.g. a hand wheel, can be used for manual operation of the valve. The torque lock 5 is associated with the drive shaft 4.

FIG. 1b shows a schematic representation of a second embodiment of the actuator 1 of the invention. The form of embodiment shown in FIG. 1b differs from that shown in FIG. 1a by a second reduction transmission 12, which is arranged between the torque lock 5 and the valve 2 at the torque lock output drive shaft 4b. The reduction transmission 12 is preferably a worm transmission. Worm transmissions usually exhibit an intrinsic self-locking, which should suppress unintended rotations of the drive shaft 4. This embodiment of an actuator 1 is especially advantageous, since, due to the interposed torque lock 5, this intrinsic self-locking of the worm transmission 12 can be omitted, whereby the overall efficiency of the actuator 1 can be improved.

FIG. 2 presents a model-like, exploded representation of a preferred form of embodiment of the torque lock 5 of the invention. Essential components of the torque lock of the invention are the wrap spring 7 and a drive shaft divided in two parts, with an entraining mechanism 8 on the drive input side and a blocking mechanism 9 on the drive output side. An entraining element 8 is attached to the torque lock input drive shaft 4a; the blocking piece 9 is attached to the torque lock output drive shaft 4b. The entraining element 8 has the form of a portion of a hollow cylinder. The two end regions 21, 22 of the entraining element 8 lie against the insides of the spring ends 10a, 10b of the wrap spring 7.

Wrap spring 7 is arranged in the blocking ring 6. Preferably, the spring wire of the wrap spring 7 has a square cross section. However, the cross section of the spring wire of the wrap spring 7 can also be round.

Blocking piece 9 is, as already indicated, provided on the torque lock output drive shaft 4b. Blocking piece 9 is composed of portions of cylindrical surfaces. The radial boundary surfaces form the end regions 23, 24 of the blocking piece 9. The first end region 23, or the second end region 24, acts, in the case of a torque introduction coming from the direction of the valve 2, respectively, on the bent spring end 10a, or on the bent spring end 10b. The bent spring ends 10a, 10b are, moreover, optimized with respect to strength in a manner such that the torque lock 5 functions process stably in high degree.

As soon as the torque lock input drive shaft 4a turns as a result of a torque introduction coming from the direction of the drive component 3, the entraining element 8 drives, with the pertinent one of the end regions 21, 22, the wrap spring 7 via the inner side of the pertinent spring end 10a, 10b. This releases the wrap spring 7 from the blocking ring 6, whereby a turning of the output drive shaft 4 is permitted.

If, in contrast, a reverse torque is introduced from the direction of the valve 2 via the torque lock output drive shaft 4b, then, depending on the turning direction, either end region 23 or end region 24 of the blocking piece 9 presses on the outside of the pertinent spring end 10a or 10b. This causes the wrap spring to be pressed with amplified force against the blocking ring 6. As a result of this pressing, a rotation of the drive shaft 4 is effectively prevented. As soon, in turn, an introduction of a torque occurs from the direction of the drive component 3, the wrap spring 7 is again released from the blocking ring 6, and the blocking action of the torque lock 5 is canceled.

FIG. 3 shows a detailed drawing of a longitudinal section through a preferred embodiment of the torque lock 5 of the invention. FIG. 3a provides a cross section according to the cutting plane A-A of FIG. 3. The torque lock 5 of the invention is arranged in a housing 13 with adapted flange 18. The torque lock 5 is arranged on the drive shaft 4.

Essential components of the torque lock 5 are the wrap spring 7, which is positioned in the blocking ring 6, the torque lock input drive shaft 4a with the entraining element 8, and the torque lock output drive shaft 4b with the blocking piece 9. Of course, the torque lock 5 could be designed such that the blocking ring 6 is part of the housing 13. Spacers 19a, 19b serve to determine the axial position of the wrap spring 7.

The torque lock 5 is mounted on the drive shaft 4 via bearings 15a, 15b, 15c. In the illustrated case, the bearings 15a, 15b are ball bearings, while bearing 15c is embodied as a needle bearing. Moreover, the torque lock 5 is sealed relative to the drive shaft 4 via the seals 14a, 14b, 14c, which are preferably O-rings. The part of the housing 13 facing the drive component 3 (not separately shown in FIG. 3) is embodied as a flange in the illustrated case.

The invention claimed is:
1. An actuator for operating a valve, comprising:
a drive component;
a drive shaft, which is connectable with the valve;
a torque lock, which is connectable with said drive shaft;
a ring-shaped housing;
at least one entraining element on said drive component, said at least one entraining element has the form of a portion of a hollow cylinder having two radial end regions; and
at least one block piece on said drive shaft, and extending radially outwardly from said drive shaft, said at least one blocking piece composed of portions of cylindrical surfaces having two radial boundary surfaces as end regions, wherein:
said torque lock includes a wrap spring as essentially a rotationally symmetric spring element arranged in said ring-shaped housing, said wrap spring having two ends;
said torque lock is so constructed that a torque introduced via said drive component rotates said drive shaft, and a torque introduced via the valve blocks rotation of said drive shaft;
the two ends of said wrap spring are so embodied and arranged that they engage said two radial end regions of said at least one entraining element, in the case of an introduction of the torque via said drive component, so that said torque lock is unlocked and said drive shaft rotates; and
the two ends of said wrap spring engage said two end regions of said at least one blocking piece so that, in the case of an introduction of the torque via the valve, the end regions of said at least one blocking piece interacts with the two end regions of said wrap spring that said torque lock blocks.

2. The actuator as claimed in claim 1, wherein:
said drive component is a direct drive.

3. The device as claimed in claim 1, wherein:
said drive component is one of:
an electric motor and an electric motor with a reduction transmission coupled thereto.

4. The device as claimed in claim 1, wherein:
said drive component is one of:
a separately operable adjustment wheel and a separately operable adjustment wheel with a reduction transmission coupled thereto.

5. The device as claimed in claim 1, further comprising:
a second reduction transmission, which is arranged between the valve and said torque lock.

6. The device as claimed in claim 5, wherein:
said second reduction transmission is a worm transmission.

7. The device as claimed in claim 1,
said torque lock is an integral part of said drive component.

8. The device as claimed in claim 1, wherein:
said torque lock is embodied as an independent function module and so constructed that it can be coupled to said drive shaft.

* * * * *